US010671665B2

(12) United States Patent
Paris

(10) Patent No.: US 10,671,665 B2
(45) Date of Patent: Jun. 2, 2020

(54) PERSONALIZED AUDIO INTRODUCTION AND SUMMARY OF RESULT SETS FOR USERS

(71) Applicant: Oath Inc., New York, NY (US)

(72) Inventor: Jonathan Paris, Palo Alto, CA (US)

(73) Assignee: Oath Inc., New York, NY (US)

( * ) Notice: Subject to any disclaimer, the term of this patent is extended or adjusted under 35 U.S.C. 154(b) by 933 days.

(21) Appl. No.: 14/866,514

(22) Filed: Sep. 25, 2015

(65) Prior Publication Data

US 2017/0090858 A1 Mar. 30, 2017

(51) Int. Cl.
*G06F 16/20* (2019.01)
*G06F 16/638* (2019.01)
*G06F 16/632* (2019.01)

(52) U.S. Cl.
CPC .......... *G06F 16/638* (2019.01); *G06F 16/632* (2019.01)

(58) Field of Classification Search
None
See application file for complete search history.

(56) References Cited

U.S. PATENT DOCUMENTS

| | | | | |
|---|---|---|---|---|
| 7,522,967 | B2* | 4/2009 | Zhang | G10L 25/48 700/94 |
| 7,689,421 | B2* | 3/2010 | Li | G10L 13/033 704/258 |
| 2004/0042592 | A1* | 3/2004 | Knott | G06F 8/20 379/88.16 |
| 2005/0262151 | A1* | 11/2005 | Plastina | G10H 1/0058 |
| 2009/0006096 | A1* | 1/2009 | Li | G10L 13/033 704/260 |
| 2011/0252014 | A1* | 10/2011 | Mital | G06F 17/30867 707/706 |
| 2016/0364397 | A1* | 12/2016 | Lindner | H04N 21/44016 |

OTHER PUBLICATIONS

Wikipedia, "Amazon Echo," last modified Apr. 9, 2016.
Wikipedia, "Cortana (software)," last modified Apr. 19, 2016.
Amazon, "Getting started with the Alexa skills kit," © 2010-2014.
Wikipedia, "Google Now," last modified Apr. 11, 2016.
Mairesse, Francois et al., "Controlling user perceptions of linguistic style: trainable generation of personality traits," Association for Computational Linguistics, Nov. 30, 2010.
Wikipedia, "Siri," last modified Apr. 16, 2016.

* cited by examiner

*Primary Examiner* — Belix M Ortiz Ditren
(74) *Attorney, Agent, or Firm* — Cooper Legal Group, LLC

(57) ABSTRACT

Disclosed are methods and apparatus for providing digital audio data including an introduction to and/or summary of a set of content items is provided. In one embodiment, a set of content items may be identified for presentation to a user. One or more personas associated with the user may be identified. Digital audio data pertaining to the set of content items may be obtained based, at least in part on the personas associated with the user. The digital audio data pertaining to the set of content items may be provided.

22 Claims, 4 Drawing Sheets

PERSONALIZED AUDIO INTRODUCTION AND SUMMARY OF RESULT SETS FOR USERS

BACKGROUND OF THE INVENTION

The present disclosure relates generally to computer implemented methods and apparatus for providing an audio introduction or summary for a set of documents provided to a user. More particularly, the disclosure relates to providing an audio introduction or summary that is personalized to a user.

Every day, millions of users search for information on the web via search engines. Through their interaction with search engines, not only are they able to locate the information they are looking for, but they also provide implicit feedback on the results shown in response to their queries by clicking or not clicking onto the search results.

Nowadays search engines can record query logs that keep various types of information about which documents (e.g., web pages or web sites) users click for which query. Such information can be seen as "soft" relevance feedback for the documents that are clicked as a result of specific queries. This "soft" relevance feedback may be used to generate a score associated with these documents that indicates the relevance of the documents to a particular query. This score may then be used by search engines to provide the most relevant documents in response to queries.

When a user submits a search query, the search results are not provided based solely on the relevance of each search result to the search query. Rather, the search results are often identified based on websites the user visited through previous search results. In addition, the search results may be further identified based upon a current location of a device via which the user submitted the search query.

SUMMARY OF THE INVENTION

Methods and apparatus for providing an audio introduction and/or summary for a set of documents are disclosed. In one embodiment, a set of content items may be identified for presentation to a user.

One or more personas associated with the user may be identified. Digital audio data pertaining to the set of content items may be obtained based, at least in part on the personas associated with the user. The digital audio data pertaining to the set of content items may be provided.

In another embodiment, the invention pertains to a device comprising a processor, memory, and a display. The processor and memory are configured to perform one or more of the above described method operations. In another embodiment, the invention pertains to a computer readable storage medium having computer program instructions stored thereon that are arranged to perform one or more of the above described method operations.

These and other features and advantages of the present invention will be presented in more detail in the following specification of the invention and the accompanying figures which illustrate by way of example the principles of the invention.

DETAILED DESCRIPTION OF THE SPECIFIC EMBODIMENTS

Figure 1:
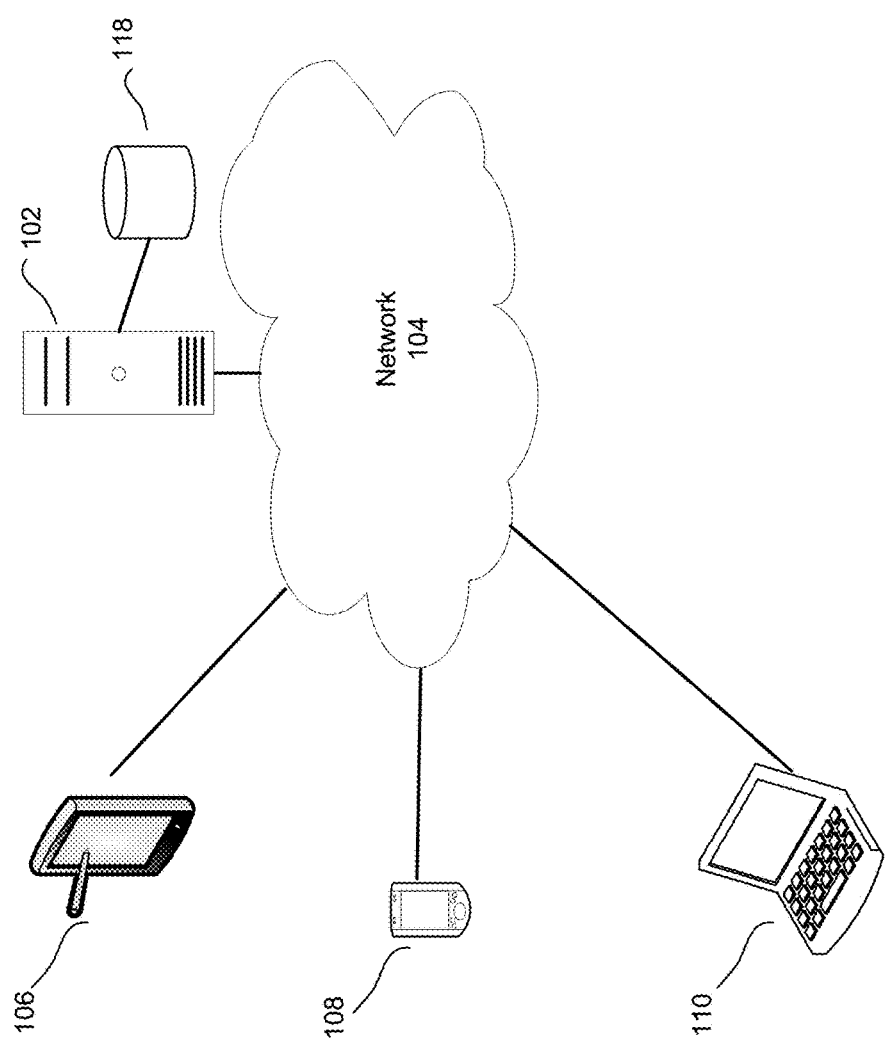
FIG. 1 is a block diagram illustrating an example system in which various embodiments may be implemented.

Reference will now be made in detail to specific embodiments of the disclosure. Examples of these embodiments are illustrated in the accompanying drawings. While the disclosure will be described in conjunction with these specific embodiments, it will be understood that it is not intended to limit the disclosure to these embodiments. On the contrary, it is intended to cover alternatives, modifications, and equivalents as may be included within the spirit and scope of the disclosure as defined by the appended claims. In the following description, numerous specific details are set forth in order to provide a thorough understanding of the disclosure. The disclosed embodiments may be practiced without some or all of these specific details. In other instances, well known process operations have not been described in detail in order not to unnecessarily obscure the disclosure. The Detailed Description is not intended as an extensive or detailed discussion of known concepts, and as such, details that are known generally to those of ordinary skill in the relevant art may have been omitted or may be handled in summary fashion.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

In recent years, the Internet has been a main source of information for millions of users. These users rely on the Internet to search for information of interest to them. One conventional way for users to search for information is to initiate a search query through a search service's web page. Typically, a user can enter a query including one or more search term(s) into an input box on the search web page and then initiate a search based on such entered search term(s). In response to the query, a web search engine generally returns an ordered list of search result documents. Generally, a search result document is identified by a Uniform Resource Locator (URL).

Recently, various applications have been developed that enable audio data to be provided to users in conjunction with search results. Some applications may add the name of the users to the audio data. However, users often tune out to the audio data since they do not find them interesting or engaging.

In accordance with various embodiments, digital audio data pertaining to content items may be personalized for a particular user. A content item may include text, image(s), audio, and/or video. In addition, the content may include a URL or hypertext link. For example, a content item may include a document or portion thereof, a calendar entry, a contact from an address book, movie times, or other information.

In one embodiment, the content items include search results identified in response to a search query. For example, the search results may include search result documents identified by corresponding URLs.

Personalization may include, for example, selecting voice characteristics such as tone, pitch, or gender. Moreover, personalization may also include selection of vocabulary used within the digital audio data, as well as the communication style of the digital audio data.

In some embodiments, the digital audio data may be personalized based, at least in part, on communications between the user and other individuals. More particularly, the digital audio data may be personalized based, at least in part, upon characteristics of the content of the communications. For example, personalization may be performed based, at least in part, on characteristics of messages transmitted by the user, as well as characteristics of messages received by the user. In addition, the digital audio data may be personalized based, at least in part, on any communication patterns that may be discerned from the communication history of the user.

Digital audio data may include an introduction to and/or summary of content items such as search results. The digital audio data may be presented prior to the search results (or other content items) or in conjunction with the search results (or other content items). Example systems and methods for providing the digital audio data will be described in further detail below.

FIG. 1 is a diagram illustrating an example system in which various embodiments may be implemented. The disclosed embodiments may be implemented in some centralized manner. This is represented in FIG. 1 by server(s) 102, which may correspond to multiple distributed devices and data store(s). The server(s) 102 and/or corresponding data store(s) may store user account data, user information, and/or content.

The server(s) 102 may be associated with a web site that provides a variety of services to its users. More particularly, the server(s) 102 may include a web server, search server, and/or content server. As will be described in further detail below, the server(s) 102 may provide audio summaries and/or introductions for content items, which may include search result documents or other content.

Documents or other content items may be identified in response to search queries. Alternatively, documents or other content items may be identified and presented to a user in the absence of a search query. For example, documents may be identified based, at least in part, on a user profile. An example user profile will be described in further detail below.

The following description refers to the generation of audio summaries and/or introductions for documents. However, it is important to note that these examples are merely illustrative. Thus, personalized audio summaries and/or introductions may also be provided for other content items.

In accordance with various embodiments, digital audio data including a summary of and/or introduction to documents such as search results may be obtained based, at least in part, on one or more "personas." For example, each persona may be characterized by a particular personality type, interest, point of view, mood, conversational style, language, vocabulary, communication style (e.g., tendency to pause), and/or voice features. Voice features may include, for example, tempo, pitch, tone, gender, accents, dialects, and/or specific pronunciations. A particular persona may be identified by name and/or corresponding characteristics.

Personas in which digital audio data is to be presented may be user-selected or system-selected. As will be described in further detail below, the system may select persona(s) to optimize the probability that the user will respond favorably to text or audio information received from the persona(s). More particularly, the personas that are system selected may reflect the persona(s) of the user, persona(s) of contacts of the user, and/or persona(s) that are deemed by the system to be compatible with the user in some way. Indications of personas have been user- or system selected for various users may be stored in corresponding user profiles.

In some embodiments, messages transmitted and/or received by the user may be analyzed to select the appropriate persona(s) for a user. Such messages may include, but are not limited to, electronic mail messages, short message service (SMS) messages, social network messages, and/or microblogging messages. Example methods of analyzing messages associated with a user will be described in further detail below.

Embodiments disclosed herein may be implemented via the server(s) 102 and/or the clients 106, 108, 110. For example, various features may be implemented via an application on the clients 106, 108, 110. The disclosed embodiments may be implemented via software and/or hardware.

As shown, a plurality of clients 106, 108, 110 may access a search application, for example, on a search server via network 104. The client devices 106, 108, 110 may be implemented, for example, via any type of computer (e.g., desktop, laptop, tablet, etc.), media computing platforms (e.g., cable and satellite set top boxes), handheld computing devices (e.g., PDAs), cell phones, or any other type of computing or communication platform.

The disclosed embodiments may be practiced in a wide variety of network environments (represented by network 104) including, for example, TCP/IP-based networks, telecommunications networks, wireless networks, etc. The network 104 may take any suitable form, such as a wide area network or Internet and/or one or more local area networks (LAN's). The network 104 may include any suitable number and type of devices, e.g., routers and switches, for forwarding search or web object requests from each client to the search or web application and search or web results back to the requesting clients.

A search application generally allows a user to search for information that is accessible via a network and related to a search query including one or more search terms. The search terms may be entered by a user in any manner. In some embodiments, the search application may present a web page having an input feature into which a user may type a query including any number of search terms. The search application may be implemented on any number of servers although only a single search server 102 is illustrated for clarity. In other embodiments, a query may be submitted via an application installed on a client device or other mechanism. For example, a user query may be submitted via a short message service (sms) message or voice input.

A set of documents that may be of interest to the user may be identified based, at least in part, on information retained in a user profile of the user. In some instances, a search engine may identify a set of search result documents that are pertinent to the search query. The set of search result documents may be personalized to the user based, at least in part, on information retained in a user profile of the user. Such information may include, but is not limited to, browsing history, search history, geographic location (e.g., work, home, and/or current location), gender, age, interests, marital status, language, personality characteristics or personas of the user, personality characteristics or personas of contacts of the user, and/or user- or system-selected persona(s). An example user profile will be described in further detail below.

In accordance with various embodiments, digital audio data (e.g., an audio clip) that includes an introduction to and/or summary of a set of documents such as search result documents may be obtained and provided in response to the search query. The audio clip may be provided in conjunction with the presentation of the documents (e.g., search results) or prior to the presentation of the documents. The audio clip may be played automatically, or may be played in response to a user action such as clicking on an icon representing the audio clip.

Digital audio data may be obtained or generated based, at least in part, on information retained in the user profile. As will be described in further detail below, digital audio data may be obtained based, at least in part, on one or more personas. Example methods of obtaining or generating digital audio data pertaining to search results will be described in further detail below with reference to FIG. 2.

The server 102 (or servers) may have access to a plurality of user profiles of users. Each profile may be associated with a corresponding user represented by user account, browser, and/or client device.

A variety of mechanisms may be implemented to support the generation of user profiles including, but not limited to, collecting or mining navigation history, stored documents, tags, messages, or annotations, to provide a few examples. Profiles of users of a search engine, for example, may give a search engine provider a mechanism to retrieve annotations, tags, stored pages, navigation history, or the like, which may be useful for making relevance determinations of search results, such as with respect to a particular user. In addition, user profiles may be used to generate or obtain digital audio data that may be presented as an introduction to or summary of search results.

In accordance with various embodiments, the server(s) 102 may have access to one or more user logs 118 (e.g., user databases) into which user information is retained for each of a plurality of users. This user information or a portion thereof may be referred to as a user profile. More particularly, the user profile may include public information that is available in a public profile and/or private information. The user logs 118 may be retained in one or more memories that are coupled to the server 102.

A user profile may be associated with one or more client devices. Conversely, each client device may be associated with a set of one or more users, enabling user profile(s) associated with the client device to be identified.

The user information retained in a user profile may indicate a plurality of features for a corresponding user. More particularly, the features may include personal information such as demographic information (e.g., age, marital status, and/or gender) and/or geographic information (e.g., residence address, work address, zip code, and/or area code). Moreover, in accordance with various embodiments, the features may indicate a language of the user, a nationality of the user, interests of the user, personality characteristics of the user, persona(s), and/or voice characteristics that may be used separately or in combination to obtain and present digital audio data in association with search results. The profile may also indicate whether the persona(s) have been user- or system-selected.

In some instances, the geographic information maintained in a user profile may indicate the current location of a user. The current location of a user may be identified based upon signals explicitly transmitted by the user or implicit signals. Examples of implicit signals include an Internet Protocol (IP) address or Global Positioning System (GPS) location of a client device, which may be used to infer a location of the user. As another example, the user's location may be implied through cell tower triangulation. In addition, a user may explicitly check in to a location via the use of a check in application, which may be accessed via a website and/or installed on a client device such as a mobile device.

In some embodiments, a computer learning algorithm may be applied to learn a model used to select persona(s) in which digital audio data is to be presented. Thus, the user profile may include parameters of a computer-generated model for selecting persona(s) for the user.

In addition, each time a user performs online activities such as clicking on a web page (or region thereof) or an advertisement, or purchasing goods or services, information regarding such activity or activities may be retained as user data in the user profile. For example, the user profile may indicate the identity of web sites visited, identity of ads that have been selected (e.g., clicked on) and/or a timestamp. In addition, the features may indicate a purchase history with respect to one or more products, one or more types of products, one or more services, and/or one or more types of services.

The user logs 118 may further include query logs into which search information is retained. Each time a user performs a search on one or more search terms, information regarding such search may be retained in the query logs. For instance, the user's search request may contain any number of parameters, such as user or browser identity and the search terms, which may be retained in the query logs. Additional information related to the search, such as a timestamp, may also be retained in the query logs along with the search request parameters. When results are presented to the user based on the entered search terms, parameters from such search results may also be retained in the query logs. For example, an identity of the specific search results (e.g., Uniform Resource Locators (URLs)), such as the web sites, the order in which the search results are presented, whether each search result is a sponsored or algorithmic search result, the owner (e.g., web site) of each search result, and/or whether each search result is selected (i.e., clicked on) by the user (if any), may be retained in the query logs.

Figure 2:
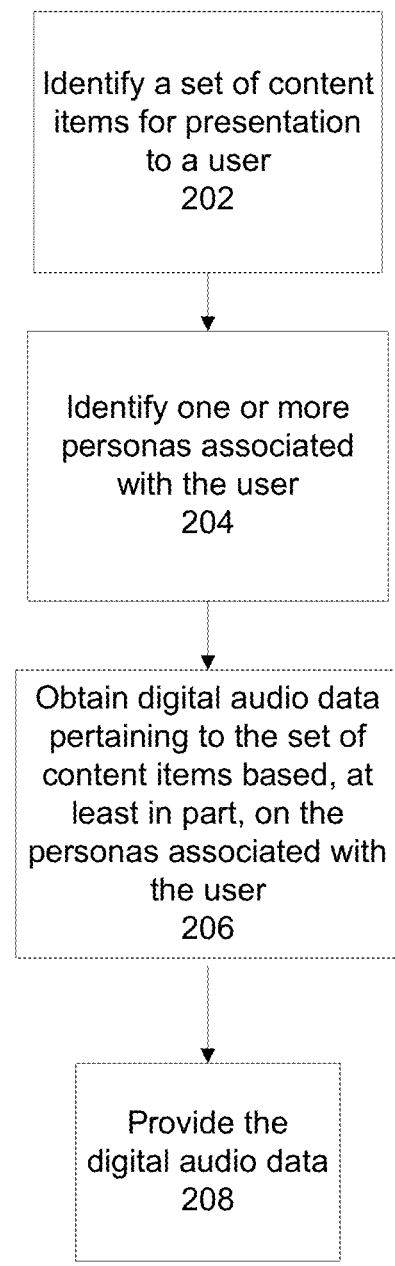
FIG. 2 is a process flow diagram illustrating an example method of providing an audio introduction or summary in accordance with various embodiments.

In some embodiments, the query logs may indicate whether digital audio data was presented in association with a corresponding search result document, whether the user chose to click on the search result, and/or persona(s) in which the digital audio data was presented. In addition, the query logs may indicate whether the persona(s) were selected by the user or by the system. FIG. 2 is a process flow diagram illustrating an example method of providing an audio introduction or summary in accordance with various embodiments. A set of content items may be identified for presentation to a user at 202. More particularly, the user may be ascertained from a browser identifier, device identifier, and/or user account identifier. The set of content items may be identified based, at least in part, on a user profile of the user. In some embodiments, a search query may be received and search results pertaining to the search query are obtained.

Input that is processed in accordance with the disclosed embodiments may be obtained using a wide variety of techniques. For example, a search query may be obtained from a user's interaction with a local application, web site or web-based application or service and may be accomplished using any of a variety of well-known mechanisms for obtaining information from a user. However, it should be understood that such methods of obtaining input from a user are merely examples and that user input may be obtained in many other ways.

A user may submit the search query via a search portal, which may be a web site such as http://search.yahoo.com. More particularly, a search query may be received via a graphical user interface. Alternatively, a search query may be received via a microphone of a client device and converted into a text query at the client device or server(s) 102. In some embodiments, a search query may be received via a text message or other form of asynchronous electronic communication.

In some embodiments, the user may indicate whether he or she wishes to receive an audio introduction/summary in association with a particular search query. More particularly, the user may opt-in or opt-out of receiving the audio introduction/summary. Stated another way, the user may enable or disable the audio introduction/summary feature. In other embodiments, the system may automatically provide an audio clip prior to or simultaneously with a corresponding set of search results.

In accordance with various embodiments, search results and/or digital audio data pertaining to the search results may be provided according to one or more personas. Each persona may be defined by a set of characteristics. Such characteristics may reflect various personality types. For example, the characteristics may include specific goal(s), interest(s), point(s) of view (e.g., bias(es) and/or mood(s)), and/or personality characteristic(s).

Characteristics of a persona may also include a conversational style(s), language, vocabulary, and/or voice features. Example voice features include, but are not limited to, tempo, pitch, tone, accent, and gender. A conversational style may indicate the tendency to pause during speaking, presence of a particular accent, pronunciation of various words, and/or length of a communication (e.g., succinct vs verbose).

A persona may be associated with one or more personality characteristics. Example personas include "agreeable," "stubborn," "argumentative," "easy-going," and "conscientious." A persona may reflect openness to new experiences or, alternatively, being close-minded.

Other example personas may include personas such as "skeptic," "cheap skate," "high-roller," "know-it-all," "competitor," "connector," "bubbly", "pushy", "creative, and "lazy." More particularly, the "skeptic" persona may operate from a point of view of an individual who is skeptical of information provided to them. As a result, the "skeptic" persona may provide a more formal, factual basis for any information or recommendations that are presented. The "cheap skate" persona may provide information/recommendations that minimize cost to the user. In contrast, the "high-roller" persona may suggest more upscale locations or venues that are popular among celebrities. The "know-it-all" persona may provide information/recommendations that are less well-known and therefore unlikely to be known by a person who "knows it all." Information/recommendations provided by a "competitor" persona may keep in mind that the person receiving the information/recommendations enjoys competing with others. As a result, the "competitor" persona might recommend watching and/or participating in competitive sports in the user's area. The "lazy" persona might only recommend activities near the user, where the user can sit the entire time. The "connector" persona may prioritize connections (e.g., physical, emotional, and/or electronic) with others when providing information/recommendations.

In some instances, a persona may correspond to a particular character or celebrity with a distinctive voice (e.g., Joan Rivers or Bugs Bunny). Such a persona may be associated with specific search terms. For example, a celebrity such as Joan Rivers may be associated with search terms such as "comedy" or "comedy clubs."

One or more personas associated with the user may be identified at 204. The personas that are recognized by the system may be entirely independent from the identity of specific users. Stated another way, a given persona is not uniquely associated with any particular user. In other words, the same persona(s) may be associated with multiple users.

Personas may be user-selectable from a plurality of personas. For example, the user may select or otherwise indicate one or more personas for which the user wishes to receive search results and/or digital audio data pertaining to the search results via his or her client device. Alternatively, one or more personas may be automatically selected without user intervention.

In addition, the system may automatically select persona(s) that are relevant to the user based at least in part upon information associated with the user. The user information may be retrieved or derived, at least in part, from a user profile such as that described herein. In addition, the user information may be ascertained from a calendar of the user, messages transmitted and/or received by the user, an interaction history with messages received by the user, an interaction history with contacts of the user, personas or personality characteristics of contacts of the user, an interaction history with search results presented in association with digital audio data, and/or an interaction history with digital audio data presented in association with search results. The persona(s) that are automatically selected may reflect persona(s) of the user, persona(s) of contacts of the user, and/or other persona(s) in which digital audio data is to be presented. Example mechanisms for performing automatic persona selection will be described in further detail below.

Where multiple personas are selected for a given user, the amount of each of the personas that is to be applied may be selected or modified by a user or the system. For example, the amounts may be indicated by percentages. Where the personas are user-selected, the system may provide a graphical user interface that enables the user to indicate the desired amount of each persona.

In some embodiments, the system may provide a recommendation of one or more of a plurality of personas. The user may then agree with the system recommendation or indicate an alternate preference of a different set of personas. For example, the system may recommend personas based, at least in part, on a context of the user.

In accordance with various embodiments, the location of the client device may be periodically ascertained and transmitted to the server(s). For example, a GPS implemented on a mobile device may transmit a location of the mobile device to the server(s). As another example, an Internet Protocol (IP) address of a client device may be transmitted to the server(s) and used to ascertain a location of the client device. As yet another example, the user may explicitly check in to a location via a check in application.

The set of content items may be personalized for the user according to the user profile of the user. As described herein, a profile may include information such as prior purchase history, marital status, general interests, and/or demographic information (e.g., age, sex, and/or zip code).

The set of content items may also be obtained with respect to specific user- or auto-selected persona(s). For example, the user may enter the query, "Events scheduled in San Francisco this weekend." In response to the user's query, search results associated with each of the selected personas maybe presented. In some embodiments, a search engine may separately obtain search results for each of the selected personas. For example, the "Food" persona may notify the user of a wine tasting, as well as notify the user of several new restaurants that have opened in San Francisco. The "Entertainment" persona may notify the user of charity events and plays scheduled in San Francisco for the weekend. The "Fitness" persona may remind the user to go to Yoga class on Saturday and to go running on Sunday with the user's running club. In other embodiments, each of the search result documents may reflect all of the personas that have been selected. For example, where the user has selected "Entertainment," "Cheapskate," and "Informal," all of these personas may be used together to identify search results and/or present digital audio data. In some instances, the personas may be applied together according to corresponding desired amounts (e.g., percentages).

Digital audio data pertaining to the set of content items may also be personalized for the user. More particularly, digital audio data pertaining to the set of content items (e.g., search results) may be generated or otherwise obtained at 206 based, at least in part, on the personas associated with the user. As described above, the personas associated with the user may include at least one of a plurality of personas. Where persona(s) are applied to identify content items for the user, the personas that are applied to obtain digital audio data may be the same as those that are applied to identify the content items for the user, related to those that are applied to identify the content items for the user, or different from those applied to identify the content items for the user. For example, consider that the user enters a search term "Buffalo Bills." Where the persona that has been selected by the user or automatically selected by the system is the sports persona, the search results that are provided may pertain to the Buffalo Bills sports team. The system may further select a sports announcer persona, and present digital audio data generated according to the sports announcer persona.

The digital audio data that is presented may include an introduction to and/or summary of the set of content items. For example, where the user enters the search query "weather," the search results may indicate that the weather in Palo Alto (where the user lives and works) is 80 degrees. The digital audio data may include a voice that states that the weather is hot. For example, where the persona is "casual," the digital audio data may state, "Dude, it's hot outside."

Where the digital audio data is obtained based on multiple personas, the different personas may be complementary. For example, the personas may include female and a French accent. If the user enters a search query, "restaurants," the system may provide an audio introduction to the search results that is a female with a French accent, as well as search results including a list of restaurants near where the user lives.

In some embodiments, the system may select an approximate length of the introduction to and/or summary of the set of content items to be provided to the user based, at least in part, on the persona(s). For example, where the system determines that the user prefers more succinct messages, the system may ascertain that a relatively short summary/introduction should be provided to the user and assign the user a "succinct" persona. The digital audio data may be generated according the assigned persona(s) and/or desired length.

Different personality types may be reflected in the conversational style, vocabulary that is used, and/or the length of a segment of an audio voice) segment or corresponding text. For example, a "casual" persona may use terms such as "sure," "yep," or "ok," while a "formal" persona may use terms such as 'yes" and "affirmative." As another example, a "verbose" persona may provide a more lengthy audio segment than a "succinct" persona.

The system may also select a vocabulary, conversational style, and/or voice features of a voice in which the digital audio data is to be presented. Example voice features include, but are not limited to, tempo, pitch, tone, gender, and/or tendency to pause. The vocabulary, conversational style and/or voice features may be selected based, at least in part, on the pertinent persona(s), as described herein. The digital audio data may be generated based, at least in part, on the vocabulary, conversational style, and voice features. For example, the text summary "It's hot today" may be revised to "Dude, it's sooo hot outside" based on a casual persona.

In some instances, the system may apply persona(s) according to corresponding amounts (e.g., percentages) indicated by the user or selected by the system. Moreover, the system may adapt the amount of a persona that is applied based, at least in part, on responsiveness of the user to the persona over time. More particularly, if the user does not tend to click on search results introduced by a given persona, the system may reduce the amount of the persona that is applied or eliminate the persona entirely. For example, where the personas include succinct, formal, and male and the user does not tend to interact with the content items presented to the user (e.g., the user does not click on the search results that are presented to the user), the system may increase the length of digital audio data that is presented in association with the next set of content items to make it less succinct.

In some instances, the digital audio data may include or be generated from pre-recorded audio data. More particularly, the digital audio data may include one or more pre-recorded audio data segments. Each pre-recorded audio data segment may be stored in association with information that associates the audio data segment with one or more search term(s), one or more documents (e.g., URLs), one or more personas, and/or one or more voice characteristics. The pertinent digital audio data segment may be identified and retrieved by looking up the pertinent search term(s), document(s), persona(s), and/or voice characteristics.

In other instances, the digital audio data may be generated, at least in part, from text that serves as a summary of and/or introduction to the set of content items. More particularly, a textual summary of and/or introduction to the set of content items may be converted to digital audio data based, at least in part, on the persona(s) and/or associated characteristics. For example, a text-to-voice converter may convert the text to voice data. As another example, one or more pre-recorded phrases that correspond to the text may be provided or appended to generate the digital audio data summary of and/or introduction to the set of content items.

In some embodiments, a text summary of the set of content items may be generated or revised based, at least in part, on the persona(s). The digital audio data may be generated based, at least in part, on a result of generating or revising the text summary of the set of content items. For example, where the personas assigned to a user include a succinct persona, a text summary that has been obtained or generated may be reduced in length.

The digital audio data may be provided at 208. The digital audio data may be played automatically or in response to user input. For example, an icon representing the digital audio data may be presented via a client device (e.g., underneath a search input feature). The user may click on the icon to play the digital audio data. In some embodiments, the user may pause, rewind, or fast-forward the digital audio data.

The set of content items (e.g., search results) may be presented in conjunction with the digital audio data. For example, the set of content items that is presented may include hypertext links associated with the corresponding search result documents. In some embodiments, the set of content items may be presented simultaneously with the digital audio data. In other words, the set of content items may be presented independent of whether the user chooses to listen to (e.g., click on) the digital audio data. In other embodiments, the set of content items may be presented after the digital audio data has been presented (e.g., after the user clicks on an icon representing the digital audio data).

Characteristics of the digital audio data may be stored in association the corresponding content items in the user account or query log data. More particularly, the user account or query log data may indicate the persona(s) in which the digital audio data has been presented. In addition, the user account may indicate whether the listened to the digital audio data. For example, the user account may indicate whether the user clicked on the digital audio data or listened to the entire digital audio data. The user account or query log data may further indicate whether the user clicked on or further interacted with the content items (e.g., search result documents) presented in association with the digital audio data. Accordingly, an interaction history indicating the presence of absence of interaction of the user with digital audio data presented in association with content items may be maintained, as well as the interaction history with the corresponding content items.

Based on the interaction history and/or characteristics of the digital audio data, the system may ascertain whether the digital audio data that was presented in association with the set of content items increased or decreased the likelihood of the user viewing or otherwise interacting with the content items (e.g., clicking on the search result documents). In some implementations, a machine learning algorithm may be trained and applied to determine the characteristics of the digital audio data that increased or decreased the likelihood of the user interacting with the corresponding set of content items. Thus, the system may select persona(s) for a user based, at least in part, on an interaction history of the user with content items for which digital audio data has been presented. Similarly, the system may adapt the amount of each of the persona(s) that are used to generate the digital audio data based, at least in part, on the interaction history. In this manner, the system may adapt the personalities that are emulated in the audio summaries/introductions that are presented in association with the content items (e.g., search results).

The system may select persona(s) that the user is most likely to like and trust. Persona(s) that are selected by the system and assigned to the user may include embody traits of the user, those that are descriptive of contacts of the user, and/or those that the system determines will complement the user, be compatible with the user, or be otherwise desirable to the user. As described above, the system may present content items such as search results and/or digital audio data according to the selected personas. The process of automated persona selection will be described in further detail below.

Automated Persona Selection

The system may automatically select one or more persona(s) that are relevant to the user based, at least in part, upon information retrieved from a profile of the user. More particularly, the information may include location(s) of the user. In addition, the information may indicate interests that have been explicitly specified by the user in their user profile, as well as implied interests. For example, interests of the user may be inferred based upon interaction of the user with online documents.

In accordance with various embodiments, the user's personality and/or likely preferences with respect to the length, conversational style, vocabulary, and/or voice characteristics of digital audio data that is presented to the user may be inferred from a location of the user, content of search queries, messages transmitted and/or received by the user, the user's interaction history with messages received by the user, the user's interaction history with contacts of the user, and/or personas/personality characteristics of contacts of the user.

In some embodiments, the system may select persona(s) based, at least in part, on one or more characteristics of a search query. For example, the characteristics of the search query may include search terms, the type of vocabulary used in the search query, and/or language in which the search query is submitted. For example, where the search query pertains to cowboys, the persona that is selected may be that of a cowboy. As another example, where the search query is in French, the persona(s) may include a French persona that speaks French and/or speaks with a French accent.

In addition, location(s) associated with the user may be used to select persona(s) in which to present digital audio data. For example, where the user is from New York, the system may select a persona having a New York accent. As another example, where the user lives in France, the system may select a persona having a French accent.

Content of messages associated with the user may also be indicative of the personality traits and/or likely preferences of the user. Messages of the user may include messages transmitted by the user and/or messages received by the user. Messages of the user may include electronic mail messages, short message service (SMS) messages, messages sent via a social network, and/or microblogging messages such as twitter messages.

In accordance with various embodiments, the content of the messages associated with the user may be analyzed to determine the type of vocabulary used by the user, the type of vocabulary used by contacts of the user, the conversational style of the user, the conversational style of contacts of the user, the length of messages of the user, and/or the length of messages of contacts of the user. In addition, the content of the messages may be analyzed to determine the language of the user and/or the language of contacts of the user.

Various inferences may be made based upon the content of various communications with the user. For example, where the user tends to send very short messages, the system may infer that the user is succinct rather than verbose. However, the system may find that the user tends to interact most with individuals who send very lengthy messages. As a result, the system may conclude that while the user tends to be succinct, he or she likely prefers to receive verbose responses. Thus, in this case, the system may select the verbose persona for purposes of providing digital audio data or other summaries to the user.

The system may determine a level of formality of communications with the user. For example, the user may tend to send very informal messages using informal vocabulary, using words like "hey," "ok," and "see you later." As another example, contacts of the user may frequently include informal language. As a result, the system may select the informal persona for the user.

In some embodiments, persona(s) may be selected for the user based, at least in part, on the context of the user. More particularly, while the user may generally prefer a particular persona when in one setting, the user may prefer another persona in different setting. For example, the user may generally prefer to communicate with a more verbose persona. However, due to time constraints, when the user is at work, he or she may wish to receive more succinct messages. Such preferences may be inferred by the system based upon analysis of various communications of the user in conjunction with the location of the user. For example, the system may ascertain that the user is at work based upon a signal received from a device of the user. Alternatively, the system may infer that the user is at work based upon the calendar of the user, day of the week and/or time of day. Thus, persona(s) may be assigned to the user based, at least in part, on the actual or inferred current location of the user in conjunction with characteristics of the communications of the user.

The frequency of communications between the user and specific contacts of the user may be indicative of the significance of these contacts to the user and the preferences of the user. Thus, communications between important contacts may be weighted more than communications with other contacts.

Similarly, the system may assign weights to messages based upon the quality of the relationship between the user and the individual with whom the user is communicating. For example, a significant weight may be assigned to the messages received by the user from his or her spouse. Thus, where the system determines that the user's spouse tends to send lengthy messages to the user, the system may infer that the user likes to receive more lengthy communications.

In some embodiments, the system may ascertain various characteristics of the user (e.g., personality characteristics and/or interests) and/or characteristics of their communications (e.g., communication style and/or vocabulary) from the content of messages and/or other sources. Individuals having some characteristics may tend to feel most comfortable with individuals having those same characteristics. In these instances, the system may assign one or more personas that embody the traits of the user. Similarly, a user having some personality characteristics may tend to feel most comfortable with individuals possessing or exhibiting characteristics that are different from or opposite to those of the user.

The optimum persona(s) in which digital audio data is to be presented may be ascertained based, at least in part, on the application of various rules. More particularly, various rules may associate various characteristics of users, their contacts, and/or their messages with a corresponding set of persona(s) in which digital audio data is to be presented to achieve an optimal user response. These rules may be applied to a specific user, across a segment of users, or all users. In some embodiments, the optimum persona(s) may be ascertained via application of a machine learning or recommendation algorithm. Therefore, the rules may include human generated rules and/or system-generated rules.

The system may determine the most suitable persona(s) in which digital audio data is to be presented based, at least in part, on various characteristics of the user, the user's contacts, and or the user's messages. More particularly, the system may assign a user with one or more personas. The assigned persona(s) may be descriptive of the user or, alternatively, may be descriptive of a personality type that complements or is compatible with the user. The system may then provide digital audio data to the user based, at least in part, on the user's assigned personas.

For example, the system may label a user as a male sports fan who is a cheapskate and uptight. The system may also determine that uptight individuals feel most comfortable communicating with easygoing, agreeable, verbose, female individuals. In response to a query for restaurants from the user, the system may provide search results identifying sports bars that are inexpensive along with a digital audio introduction/summary that is presented in informal vocabulary and in a verbose manner in a female voice. In this manner, characteristics or persona(s) of the user and/or associated individuals may be used to select persona(s) and/or voice characteristics for use in providing digital audio data introducing and/or summarizing a set of documents or other content items.

Figure 3:
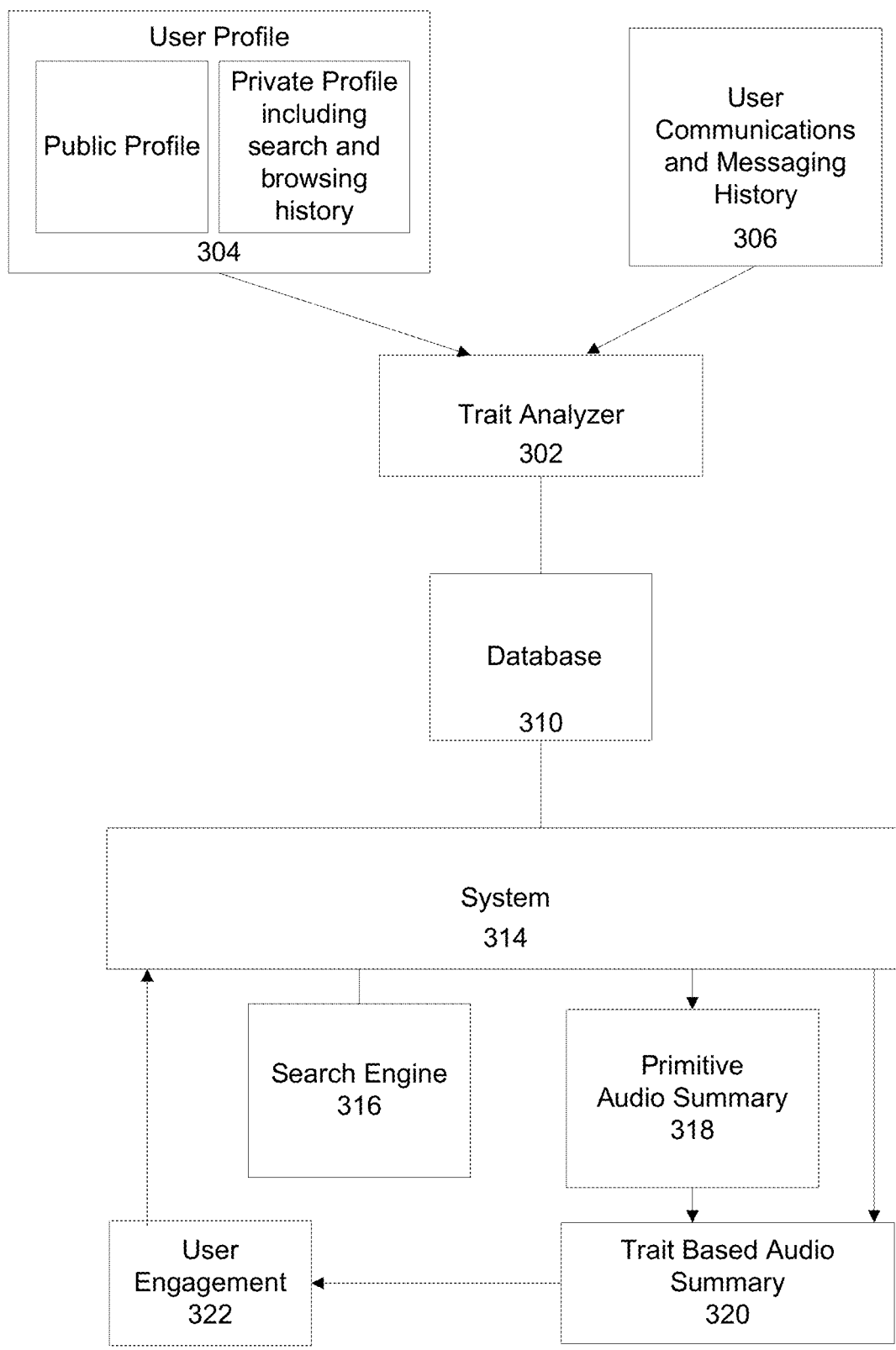
FIG. 3 is a block diagram illustrating an example system for generating personalized audio introductions or summaries.

FIG. 3 is a block diagram illustrating an example system for generating personalized audio introductions or summaries. As shown in FIG. 3, a trait analyzer 302 may receive or otherwise access a user profile 304 of a user or information derived from the user profile 304. The user profiles 304 may include public profiles and private profiles. As described above, a private profile of a particular user may include a search and browsing history of the user. In addition, the trait analyzer may receive or otherwise access user communications and a messaging history 306 corresponding to those communications (or information derived from the communications and/or messaging history).

For a given user, the trait analyzer 302 may apply various rules to the user profile, user communications, and messaging history to select persona(s) (e.g., traits) for the user. For example, the trait analyzer 302 may select persona(s) that it determines would be most suitable for presentation of digital audio data to the user, as described herein. The rules may be associated with the user, a set of similar users having similar traits, and/or may be global rules applied to all users. An indication of the persona(s) selected for the user may be stored in a database 310. In some embodiments, weights associated with the selected persona(s) may also be determined and stored in the database 310, where the weights indicate the amounts of the corresponding personas to apply for a given user. Therefore, the trait analyzer 312 may generate a model associated with the user with weights corresponding to various traits, which may be stored in the database 310.

In some embodiments, the trait analyzer 312 may learn to associate specific persona(s) with the user under a given context. For example, the context may include a time of day, day of week, location of the user, and/or location of a client device of the user. In addition, the trait analyzer 312 may learn that when the user is at work, he or she tends to receive more succinct messages. Thus, the system may learn that the user finds a set of personas engaging under particular context(s). Accordingly, multiple sets of personas (and corresponding models) may be associated with a user, along with an indication of the context(s) in which the corresponding set of personas is to be applied.

A system 314 may access the database 310 or otherwise receive an indication of the persona(s) selected for the user. As described above, multiple sets of personas may be associated with corresponding contexts. Thus, the system 314 may ascertain the current context of the user to select the appropriate set of personas for the current context. In some embodiments, the system 314 may obtain weights (e.g., a model) that indicate the appropriate amount of each of the automatically selected personas to use for a given user in the generation of digital audio data. For example, the weights may be default weights or may be obtained from the persona database.

Content items such as documents may be identified for the user by a search engine 316. More particularly, search results may be obtained in response to receiving a search query. Alternatively, content items may be identified in the absence of a search query. Although not shown in this example, the content items may be personalized for the user, as described above. For example, the content items may be personalized based, at least in part, on the user profile and/or selected persona(s).

A primitive audio summary of the content items (e.g., search results) may be generated or otherwise obtained at 318. More particularly, the primitive audio summary may include a text summary of the content items that has been generated according to the selected persona(s). For example, a text summary may be generated for search result documents using individual summaries associated with the documents, key words associated with the documents, natural language processing, pattern recognition, image recognition, metadata (e.g., tags) associated with the documents, and/or other suitable mechanisms.

A trait-based audio summary may be generated or obtained at 320 from the primitive audio summary and the persona(s) that are associated with the user. More particularly, one or more audio segments corresponding to the text summary may be obtained. This may be accomplished, for example, via a look-up table or other suitable data structure(s).

After the trait-based audio summary is presented via a client device, a user may click on or otherwise interact with the documents or other content items presented in association with the audio summary. Based upon this user engagement 322 or lack thereof, the system 314 may learn to predict which persona(s) are engaging or relevant to the user. As a result, the system 314 may update its model associated with the user based, at least in part, on the user engagement 322 or lack thereof. For example, the system 314 may modify weights associated with the personas based, at least in part, on any user engagement 322 or lack thereof. In this manner, the amounts of the personas that are applied may be revised. This may include selecting additional personas (e.g., by increasing a weight from zero) and/or eliminating personas (e.g., by reducing a weight to zero). Therefore, the system 314 may learn to generate digital audio data that is most likely to be interesting and engaging to the user based upon implicit and explicit user feedback.

In some embodiments, multiple models may be associated with different contexts. Thus, the model associated with the current context may be updated based upon the user engagement 322 or lack thereof. For example, the system 314 may determine based upon the user's context that the user is at work. In addition, the system 314 may learn that when the user is at work, he or she prefers to receive more formal audio summaries. As a result, the system 314 may increase the weight associated with the "succinct" trait of the persona for the "work" context.

The trait analyzer 302 may monitor or receive updates to the user profile 304. Similarly, the trait analyzer 302 may monitor or receive updates to the user communications and corresponding messaging history 306. Based upon these updates, the trait analyzer 302 may generate a revised set of traits of the user and/or select a revised set of persona(s) (e.g., traits) for the user. In some instances, the trait analyzer 302 may update a model associated with the user. Alternatively, the system 314 may update its rules and/or a model associated with the user to reflect the updated user traits or selected persona(s). Therefore, the trait analyzer 302 and system 314 may operate in real-time, enabling the rules/models applied by the system 314 to be continuously updated.

While the example described above with reference to FIG. 3 refers to a single user, this example is merely illustrative. Therefore, the system may generate audio data for multiple users having corresponding user profiles.

Network Environment

Digital audio data including a summary of and/or introduction to a set of content items such as search results may be provided in any of a wide variety of computing contexts. For example, implementations are contemplated in which users interact with a diverse network environment via any type of computer (e.g., desktop, laptop, tablet, etc.), media computing platforms (e.g., cable and satellite set top boxes and digital video recorders), handheld computing devices (e.g., PDAs), cell phones, or any other type of computing or communication platform.

Implementations are contemplated in which users interact with a diverse network environment. For example, the network environment may include a variety of networks, such as a LAN/WAN.

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Content items and audio data may be identified and retrieved via a content distribution network. A distributed system may include a content distribution network. A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

Content items and audio data may also be identified and presented in a peer-to-peer network. A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling devices via an ad hoc arrangement or configuration. A peer-to-peer network may employ some devices capable of operating as both a "client" and a "server."

In some embodiments, the network environment may include a wireless network that couples client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Communications transmitted via a network typically include signal packets. Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

Signal packets may be communicated between devices of a network, such as, for example, to one or more sites employing a local network address. A signal packet may, for example, be communicated over the Internet from a user site via an access device coupled to the Internet. Likewise, a signal packet may be forwarded via network devices to a target site coupled to the network via a network access device, for example. A signal packet communicated via the Internet may, for example, be routed via a path of gateways, servers, etc. that may route the signal packet in accordance with a target address and availability of a network path to the target address.

Various embodiments may be employed via one or more servers. A computing device that is capable of sending or receiving signals, such as via a wired or wireless network, or capable of processing or storing signals, such as in memory as physical memory states, may operate as a server. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some instances, content items may be identified or provided via a content server. A content server may comprise a device that includes a configuration to provide content via a network to another device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example.

Examples of devices that may operate as a content server include desktop computers, multiprocessor systems, microprocessor-type or programmable consumer electronics, etc.

Client Device

Figure 4:
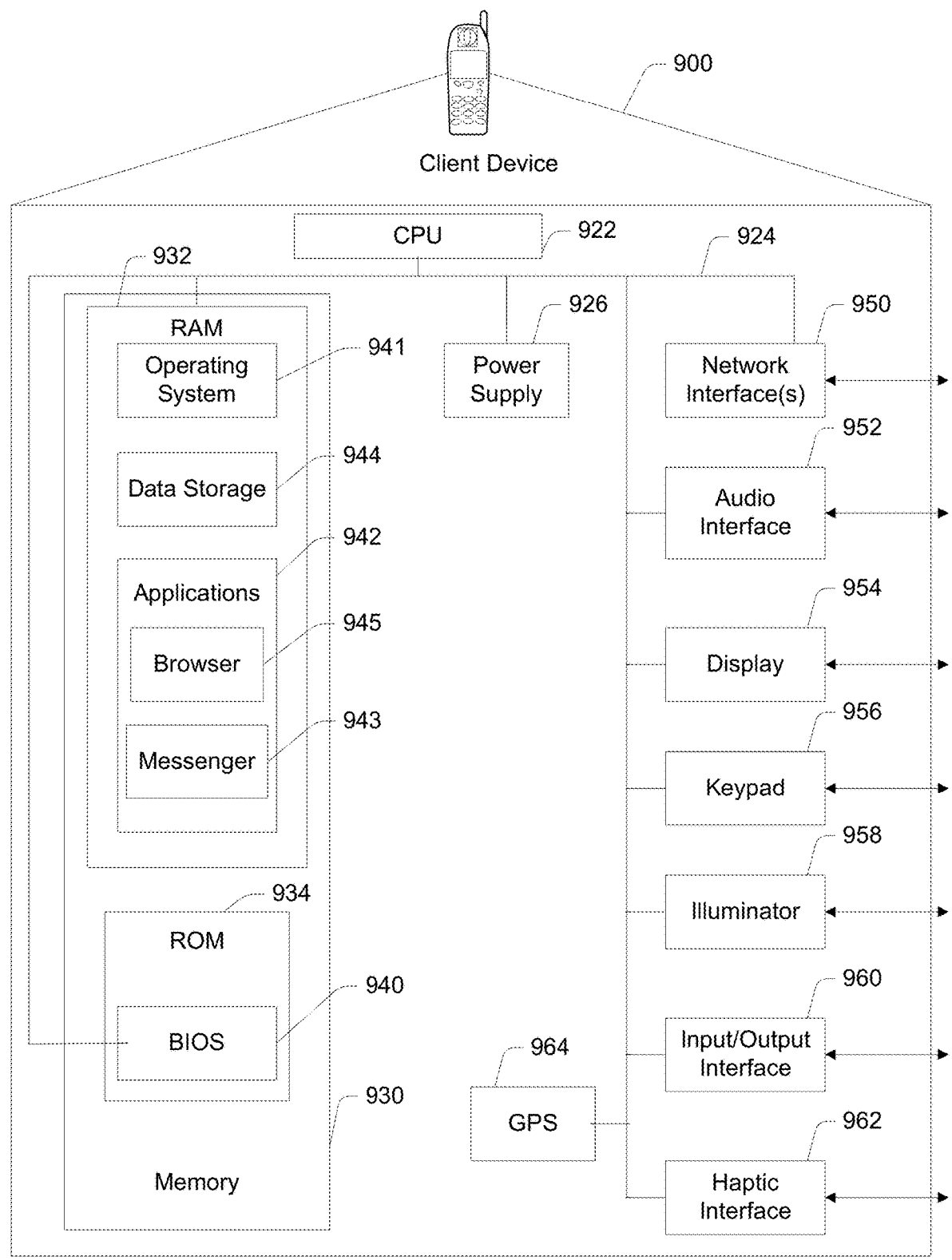
FIG. 4 is a diagram illustrating an example client device in which various embodiments may be implemented.

Content items such as search results and associated audio data may be presented via a client device. FIG. 4 is a schematic diagram illustrating an example embodiment of a client device in which various embodiments may be implemented. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. A portable device may also be referred to as a mobile device or handheld device.

As shown in this example, a client device 900 may include one or more central processing units (CPUs) 922, which may be coupled via connection 924 to a power supply 926 and a memory 930. The memory 930 may include random access memory (RAM) 932 and read only memory (ROM) 934. The ROM 934 may include a basic input/output system (BIOS) 940.

The RAM 932 may include an operating system 941. More particularly, a client device may include or may execute a variety of operating systems, including a personal computer operating system, such as a Windows, iOS or Linux, or a mobile operating system, such as iOS, Android, or Windows Mobile, or the like. The client device 900 may also include or may execute a variety of possible applications 942 (shown in RAM 932), such as a client software application such as messenger 943, enabling communication with other devices, such as communicating one or more messages, such as via email, short message service (SMS), or multimedia message service (MMS), including via a network, such as a social network, including, for example, Facebook, LinkedIn, Twitter, Flickr, or Google, to provide only a few possible examples. The client device 800 may also include or execute an application to communicate content, such as, for example, textual content, multimedia content, or the like, which may be stored in data storage 944. A client device may also include or execute an application such as a browser 945 to perform a variety of possible tasks, such as browsing, searching, playing various forms of content, including locally stored or streamed video, or games (such as fantasy sports leagues).

The client device 900 may send or receive signals via one or more interface(s). As shown in this example, the client device 900 may include one or more network interfaces 950. The client device 900 may include an audio interface 952. In addition, the client device 900 may include a display 954 and an illuminator 958. The client device 900 may further include an Input/Output interface 960, as well as a Haptic Interface 962 supporting tactile feedback technology.

The client device 900 may vary in terms of capabilities or features. Claimed subject matter is intended to cover a wide range of potential variations. For example, a cell phone may include a keypad such 956 such as a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) 964 or other location identifying type capability, or a display with a high degree of functionality, such as a touch-sensitive color 2D or 3D display, for example. The foregoing is provided to illustrate that claimed subject matter is intended to include a wide range of possible features or capabilities.

According to various embodiments, input may be obtained using a wide variety of techniques. For example, input may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input may be obtained in many other ways.

In some embodiments, an identity of the user (e.g., owner) of the client device may be statically configured. Thus, the device may be keyed to an owner or multiple owners. In other embodiments, the device may automatically determine the identity of the user of the device. For instance, a user of the device may be identified by deoxyribonucleic acid (DNA), retina scan, and/or finger print. From the identity of the user, a user profile and/or client profile may be identified or obtained.

Regardless of the system's configuration, it may employ one or more memories or memory modules configured to store data, program instructions for the general-purpose processing operations and/or the inventive techniques described herein. For example, the program instructions may control the operation of one or more applications. The memory or memories may also be configured to store instructions for performing the disclosed methods, graphical user interfaces to be displayed in association with the disclosed methods, etc.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks and magnetic tape; optical media such as CD-ROM disks; magneto-optical media such as optical disks; and hardware devices that are specially configured to store and perform program instructions, such as ROM and RAM. Examples of program instructions include both machine code, such as produced by a compiler, and files containing higher level code that may be executed by the computer using an interpreter.

Computer program instructions with which various embodiments are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques may be implemented in any suitable combination of software and/or hardware system, such as a web-based server or desktop computer system. An apparatus and/or web browser may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Although the foregoing embodiments have been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
    identifying, by one or more servers, a set of content items for presentation to a user;
    identifying, by the one or more servers, one or more personas associated with the user, wherein the identifying the one or more personas comprises selecting a first persona of the one or more personas from a plurality of personas based, at least in part, on one or more characteristics of one or more messages transmitted by the user and one or more characteristics of one or more messages received by the user;
    obtaining, by the one or more servers, digital audio data pertaining to the set of content items based, at least in part, on the one or more personas associated with the user, the one or more personas indicating one or more voice characteristics of a voice in which the digital audio data is to be provided; and
    providing, by the one or more servers, the digital audio data pertaining to the set of content items for presentation via a client device according to the one or more voice characteristics, the digital audio data including at least one of a summary of the set of content items or an introduction to the set of content items.

2. The method as recited in claim 1, comprising:
    receiving, by the one or more servers from the client device, a search query; and
    providing, by the one or more servers to the client device, the set of content items;
    wherein the identifying the set of content items includes obtaining a set of search results pertaining to the search query, the digital audio data being a summary of the set of search results or an introduction to the set of search results.

3. The method as recited in claim 1, comprising:
    receiving, by the one or more servers from the client device, an indication of input selecting the one or more personas from a plurality of personas.

4. The method as recited in claim 1, comprising:
    selecting, by the one or more servers, at least one of the one or more personas from the plurality of personas based, at least in part, on a user profile of the user, the user profile indicating one or more personality characteristics of the user.

5. The method as recited in claim 1, comprising:
    analyzing the one or more messages transmitted by the user and the one or more messages received by the user to determine at least one characteristic associated with communications of the user;
    wherein the selecting is based, at least in part, on the at least one characteristic.

6. The method as recited in claim 1, comprising:
    selecting, by the one or more servers, a second persona from the plurality of personas based, at least in part, on an interaction history of the user, wherein the interaction history indicates a history of interaction with content items for which at least some digital audio data has been presented;
    wherein the obtaining the digital audio data pertaining to the set of content items is performed based, at least in part, the second persona.

7. The method as recited in claim 1, comprising:
    receiving, by the one or more servers from the client device, a search query, wherein the identifying the set of content items includes obtaining search results pertaining to the search query; and
    selecting, by the one or more servers, a second persona from a plurality of personas based, at least in part, on one or more characteristics of the search query;
    wherein the obtaining the digital audio data pertaining to the set of content items is performed based, at least in part, the second persona.

8. A computer program product comprising at least one non-transitory computer readable storage medium having computer program instructions stored thereon, the computer program instructions being configured such that, when executed by one or more processors, the computer program instructions cause the one or more processors to:
    identify a set of content items for presentation to a user;
    identify one or more personas associated with the user, wherein the identifying the one or more personas comprises selecting a first persona of the one or more personas from a plurality of personas based, at least in part, on one or more characteristics of one or more messages transmitted by the user;
    obtain digital audio data pertaining to the set of content items based, at least in part, on the one or more personas associated with the user, the one or more personas indicating one or more voice characteristics of a voice in which the digital audio data is to be provided; and
    provide, for presentation via a client device, the digital audio data pertaining to the set of content items according to the one or more voice characteristics, the digital audio data including at least one of a summary of the set of content items or an introduction to the set of content items.

9. The computer program product as recited in claim 8, the computer program instructions being configured to:
    select a second persona from the plurality of personas based, at least in part, on an interaction history of the user with one or more content items for which digital audio data has been presented.

10. The computer program product as recited in claim 8, the computer program instructions being configured to:
    select a second persona from the plurality of personas based, at least in part, on one or more characteristics of one or more messages received by the user.

11. The computer program product as recited in claim 8, the computer program instructions being configured to:
    select a second persona from the plurality of personas based, at least in part, on one or more personality characteristics of the user.

12. The computer program product as recited in claim 8, the computer program instructions being configured to:
  select at least one of the one or more voice characteristics, the one or more voice characteristics including at least one of: a conversational style, a vocabulary, a gender, an accent, a tempo, a pitch, or a tone.

13. The computer program product as recited in claim 8, the computer program instructions being configured to:
  select or modify an amount of at least a first one of the one or more personas in relation to an amount of at least a second one of the one or more personas;
  wherein the digital audio data is obtained based, at least in part, on the amount of the first one of the one or more personas in relation the amount of the second one of the one or more personas.

14. An apparatus, comprising:
  one or more processors; and
  one or more memories, at least one of the one or more processors or the one or more memories being configured to:
    identify a set of content items for presentation to a user;
    identify one or more personas associated with the user, wherein the identifying the one or more personas comprises selecting a first persona of the one or more personas from a plurality of personas based, at least in part, on one or more characteristics of one or more messages received by the user;
    obtain digital audio data pertaining to the set of content items based, at least in part, on the one or more personas associated with the user, the one or more personas indicating one or more voice characteristics of a voice in which the digital audio data is to be provided; and
    provide, for presentation via a client device, the digital audio data pertaining to the set of content items according to the one or more voice characteristics, the digital audio data including at least one of a summary of the set of content items or an introduction to the set of content items.

15. The apparatus as recited in claim 14, at least one of the one or more processors or the one or more memories being configured to:
  select the one or more voice characteristics from a plurality of voice characteristics based, at least in part, on at least one of the one or more personas; and
  generate the digital audio data based, at least in part, on the one or more voice characteristics.

16. The apparatus as recited in claim 15, wherein the one or more voice characteristics comprise at least one of a conversational style, tempo, pitch, tone, accent, or gender.

17. The apparatus as recited in claim 14, at least one of the one or more processors or the one or more memories being configured to:
  select an approximate desired length based, at least in part, on at least one of the one or more personas; and
  generate the digital audio data according the approximate desired length and the one or more voice characteristics.

18. The apparatus as recited in claim 14, the one or more voice characteristics including a vocabulary, at least one of the one or more processors or the one or more memories being configured to:
  select the vocabulary based, at least in part, on at least one of the one or more personas; and
  generate the digital audio data based at least in part on the one or more voice characteristics.

19. The apparatus as recited in claim 14, at least one of the one or more processors or the one or more memories being configured to:
  obtain a set of text, the set of text including a text summary of the set of content items or a text introduction to the set of content items; and
  generate the digital audio data from the set of text based, at least in part, on at least one of the one or more voice characteristics.

20. The apparatus as recited in claim 14, at least one of the one or more processors or the one or more memories being configured to:
  generate the digital audio data based, at least in part, on one or more pre-recorded phrases that correspond to at least one of the one or more personas.

21. The method as recited in claim 1, the one or more voice characteristics comprising at least one of: a conversational style, a vocabulary, a gender, an accent, a tempo, a pitch, or a tone.

22. The method as recited in claim 1, comprising:
  receiving an indication of user input selecting an amount of at least a first one of the one or more personas in relation to an amount of at least a second one of the one or more personas;
  wherein the digital audio data is obtained based, at least in part, on the amount of the first one of the one or more personas in relation to the amount of the second one of the one or more personas.

* * * * *